(12) United States Patent  (10) Patent No.: US 9,031,404 B2
Wagener et al.  (45) Date of Patent: May 12, 2015

(54) OPTICAL CHANNEL MONITOR

(75) Inventors: Jefferson L. Wagener, Morristown, NJ (US); Thomas Andrew Strasser, Warren, NJ (US)

(73) Assignee: Nistica, Inc., Bridgewater, NJ (US)

( * ) Notice: Subject to any disclaimer, the term of this patent is extended or adjusted under 35 U.S.C. 154(b) by 619 days.

(21) Appl. No.: 12/545,591

(22) Filed: Aug. 21, 2009

(65) Prior Publication Data

US 2010/0046944 A1  Feb. 25, 2010

Related U.S. Application Data

(60) Provisional application No. 61/090,722, filed on Aug. 21, 2008.

(51) Int. Cl.
*H04B 10/07*  (2013.01)
*H04J 14/02*  (2006.01)
*H04B 10/079*  (2013.01)

(52) U.S. Cl.
CPC ............. *H04J 14/02* (2013.01); *H04J 14/021* (2013.01); *H04J 14/0212* (2013.01); *H04B 10/07955* (2013.01); *H04B 10/07957* (2013.01)

(58) Field of Classification Search
USPC .......................................................... 398/34
See application file for complete search history.

(56) References Cited

U.S. PATENT DOCUMENTS

| | | | |
|---|---|---|---|
| 5,943,147 A * | 8/1999 | Vanoli et al. ................ | 398/27 |
| 6,226,117 B1 * | 5/2001 | Hentschel ................... | 359/337 |
| 6,262,822 B1 | 7/2001 | Obhi et al. | |
| 6,263,123 B1 | 7/2001 | Bishop et al. | |
| 6,430,328 B1 | 8/2002 | Culver et al. | |
| 6,956,687 B2 | 10/2005 | Moon et al. | |
| 7,092,599 B2 | 8/2006 | Frisken | |
| 7,123,833 B2 | 10/2006 | Szczepanek et al. | |
| 7,126,740 B2 | 10/2006 | Szczepanek et al. | |
| 7,397,980 B2 | 7/2008 | Frisken | |
| 2003/0002135 A1* | 1/2003 | Futami et al. ................ | 359/326 |
| 2004/0008401 A1* | 1/2004 | Szczepanek et al. ........ | 359/290 |
| 2004/0161242 A1* | 8/2004 | Xu ............................... | 398/149 |

FOREIGN PATENT DOCUMENTS

| | | |
|---|---|---|
| JP | 06-058811 | 3/1994 |
| JP | 06-029884 | 2/2006 |
| WO | 02/099368 A1 | 12/2002 |
| WO | 03/028266 A2 | 4/2003 |
| WO | 2006/128254 A1 | 12/2006 |

OTHER PUBLICATIONS

T. Yamaguchi, Wavelength Selective Switch (WSS) by Digital Micromirror Device, published Feb. 21, 2011, pp. 22-25.

* cited by examiner

*Primary Examiner* — Nathan Curs
(74) *Attorney, Agent, or Firm* — Stuart H. Mayer; Mayer & Williams PC (57) ABSTRACT

A method of monitoring a WDM optical signal is provided. The method includes: receiving a WDM optical signal having a plurality of channels; detecting the optical signal after filtering the WDM optical signal with a tunable filter; and reconfiguring at least the center wavelength and bandwidth of the tunable filter optical transfer function to determine a signal performance parameter of the WDM optical signal.

26 Claims, 9 Drawing Sheets

OPTICAL CHANNEL MONITOR

STATEMENT OF RELATED APPLICATIONS

This application claims the benefit of U.S. Provisional Patent Application Ser. No. 61/090,722, filed Aug. 21, 2008, entitled "Optical Channel Monitor," the entire disclosure of which is incorporated by reference in its entirety herein.

BACKGROUND OF THE INVENTION

Fiber optic communication systems typically employ wavelength division multiplexing (WDM), which is a technique for using an optical fiber to carry many spectrally separated independent optical channels. In a wavelength domain, the optical channels are centered on separate channel wavelengths which in dense WDM (WDM) systems are typically spaced apart by 25, 50, 100 or 200 GHz. Information content carried by an optical channel is spread over a finite wavelength band, which is typically narrower than the spacing between channels.

Optical channel monitoring is increasingly being used by telecommunications carriers and multi-service operators of fiber optic systems. As the traffic on optical networks increases, monitoring and management of the networks become increasingly important issues. To monitor the network, the spectral characteristics of the composite signal at particular points in the network must be determined and analyzed. This information may then be used to optimize the performance of the network. Optical channel monitoring is particularly important for modern optical networks that use reconfigurable and self-managed fiber-optic networks.

For example, reconfigurable optical add/drop multiplexers (ROADMs) and optical cross connects, which are used to manipulate individual wavelength channels as they are transmitted along the network, require an optical channel monitor. A ROADM allows dynamic and reconfigurable selection of wavelength channels that are to be added or dropped at intermediate nodes along the network. In a ROADM, for instance, an optical channel monitor can provide an inventory of incoming channels as well as an inventory of outgoing channels and to provide channel-power information to variable optical attenuator (VOA) control electronics so that the power of added channels can be equalized with the pass-through channels.

Ideally, monitoring of an optical communications system should be based on the analysis of the actual optical signal waveform across the entire range of wavelengths of interest. Spectral analysis of this type can be performed using a variety of known signal and spectrum analysis equipment. For example, optical signal analyzers are known for determining characteristics of an optical signal such as, for example, power level, enter wavelength, extinction ratio, eye opening, signal-to-noise ratio, polarization dependent loss (PDL), dispersion etc.

A number of different devices have traditionally been used as optical channel monitors. For instance, in order to monitor respective channels of a WDM optical communications system a Parallel Detection Monitor (PDM) can be used to determine average and peak power levels, as a function of wavelength, across any desired range of wavelengths. The PDM uses a grating or other device to split or demultiplex a WDM signal into its individual channels or wavelengths and a series of photodetectors to measure the power in each channel or wavelength. Alternatively, a Tunable Filter Monitor (TFM) may be implemented using a fixed filter bandwidth, center wavelength tunable optical filter together with an optical detector. Such a filter transmits or reflects only a narrow portion of the transmission band, which can then be detected by the detector. By scanning the filter center wavelength across the entire transmission band, a full spectral picture of the transmission band can be obtained, and the channel information (e.g., wavelength, power, OSNR) can be extracted using suitable signal processing methods. Tunable filters can be implemented using for example thin film technology to create a Fabry-Perot type filter, with the tuning accomplished either by temperature effects, using liquid crystals, or by tuning the angle at which the signal is incident on the filter. Other technologies for implementing tunable filters include, but are not limited to, tunable Bragg gratings and filters based on the acousto-optic effect.

While the above-described devices enable some degree of optical channel monitoring, they tend to suffer from a number of disadvantages. In particular, these devices need to be calibrated for a signal having a particular fixed channel plan. The channel plan may specify a number of parameters such as the center frequency and bandwidth of each channel, the spacing between channels, a power level of each channel and the modulation format used by each channel. In the case of an PDM, the channel spacing and the filtering characteristics such as the bandwidth of each channel must both be selected in advance. While a channel monitor using a tunable filter has the ability to scan across the wavelengths, thus in principle allowing a channel plan with irregular channel spacings to be monitored, such a monitor still requires advance knowledge of the channel bandwidth and modulation format. Therefore these devices cannot be designed to be independent of the network's channel plan.

SUMMARY OF THE INVENTION

In accordance with the present invention, a method of monitoring a WDM optical signal is provided. The method includes: receiving a WDM optical signal having a plurality of channels; detecting the optical signal after filtering the WDM optical signal with a tunable filter; and reconfiguring at least the center wavelength and bandwidth of the tunable filter optical transfer function to determine a signal performance parameter of the WDM optical signal.

In accordance with another aspect of the invention, an optical device is provided that includes an input port for receiving a WDM optical signal and a tunable optical filter with programmable wavelength dependent transmission to change at least the center wavelength and bandwidth of the optical transfer function of the optical signal. The optical device also includes a detector for receiving the optical signal after being modulated by the tunable optical filter. A controller is configured to cause the tunable optical filter to be arranged into optical transfer functions between the input port and the detector which samples different components of the spectrum of the WDM optical signal using at least a first and second optical transfer function between the input port and the detector. The optical transfer functions passband characteristics are optimized to improve the measurement accuracy of different channels or components of the WDM optical signal.

DETAILED DESCRIPTION

For a variety of reasons WDM optical communication systems are increasingly being used to carry traffic that have different or varying channel plans. For instance, traffic having mixed transmission rates of 2.5, 10, 40 and even 100 Gb/s may be carried on the same system. In some cases these channel plans may change over time. For instance, if a channel is used to support a service requiring a 100 GHz signal, but at a later time only requires a 10 GHz signal, it would be most efficient to reduce the amount of bandwidth allocated to that channel when it is only being used to carry the 10 GHz signal. In other cases the channel plan employed by the traffic may be unknown to the service operator of the network carrying the traffic. This may be the case, for instance, when the network is carrying traffic (i.e., alien wavelengths) from a third party service operator. As another example, as system needs change over time, it may be desirable to reconfigure the system through the use of a programmable channel plan that can be re-programmed or changed on an as-needed basis.

Because of the increased flexibility in the types of traffic that optical communication systems are being required to carry, an optical channel monitor should ideally be designed so that it is independent of the network's channel plan. That is, an ideal channel monitor should be able to accurately monitor traffic having any arbitrary or programmable channel plan, and preferably without having any a priori knowledge of the channel plan or any other characteristics of the optical signal. In order to accomplish this, the optical channel monitor needs to detect the signal, determine its characteristics (e.g., channel bandwidth), and, based on the characterization, apply an appropriate filter to quickly and accurately acquire information concerning the signal such as its power level.

More particularly, a channel plan independent monitor can be formed from a suitable tunable filter in combination with a photodetector. The tunable filter can be used first as a narrow-band filter to characterize the signal by measuring the bandwidth and location of the individual channels as the passband of the filter is scanned across the signal spectrum. In this way the signal profile or channel plan can be determined. Given the channel plan, the tunable filter can be reconfigured so that it has an appropriate shape to determine in a single measurement signal performance parameters such as the aggregate signal power level, for instance. That is, the tunable filter is adjusted or tuned so that no components of the signal are removed which would impact the accuracy of the measurement.

One example of a tunable filter that may be employed in the present invention incorporates a spatial light modulator (SLM). A spatial light modulator (SLM) consists of an array of optical elements (pixels) in which each pixel acts independently as an optical "valve" to adjust or modulate light intensity. An optical signal is dispersed onto the array along a spectral axis or direction so that the individual channels in the signal are spread over multiple ones of the optical elements. Each channel, or a group of channels, may be selectively attenuated or blocked by actuating a select number of optical elements so that the portion of the channel incident on those selected optical elements are directed away from a return path.

Figure 1:
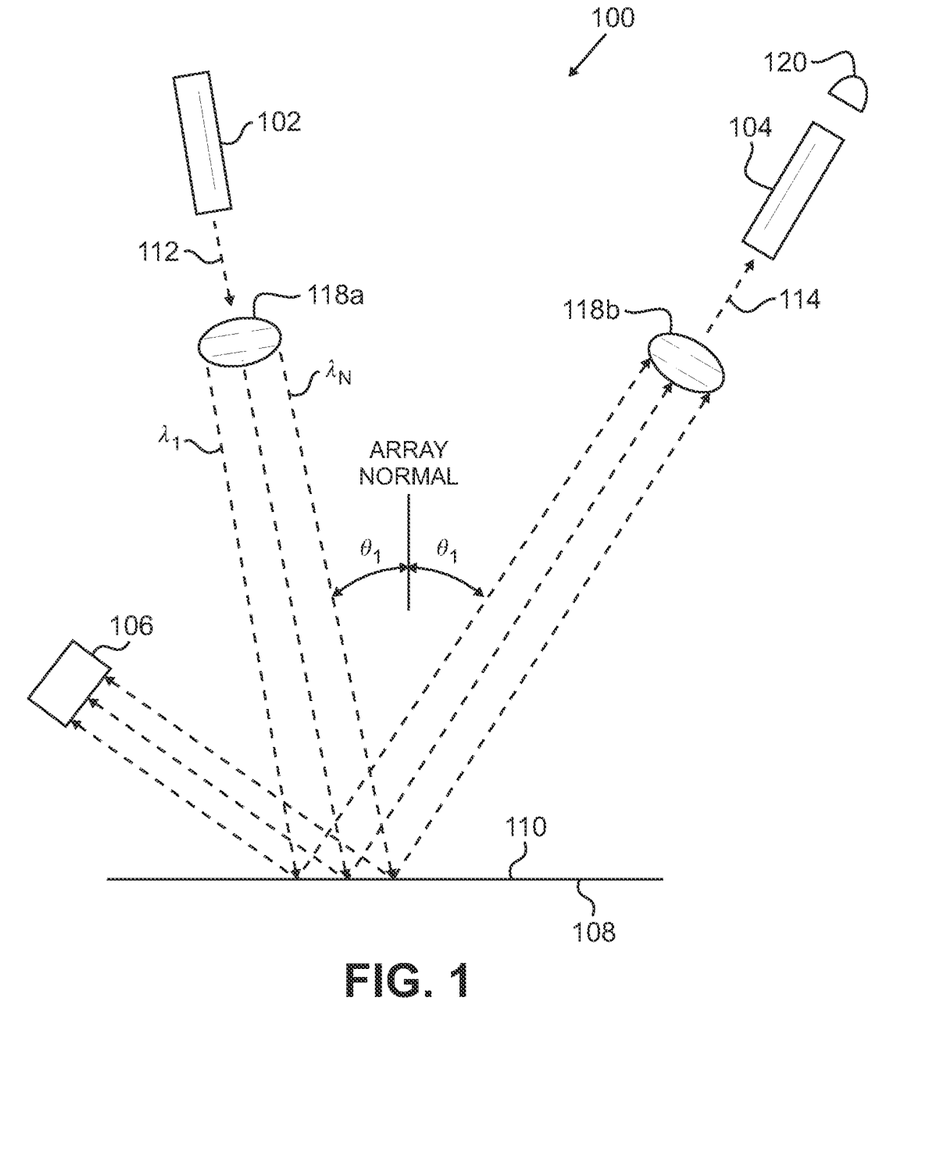
FIG. 1 is a block diagram of one example of an optical device that may be used as an optical channel monitor.

FIG. 1 is a block diagram of one example of an optical device 100 that may be used as an optical channel monitor. The optical device 100 employs a SLM which acts as a tunable filter for filtering an incoming optical beam or signal. Optical device 100 includes an input optical fiber 102 capable of introducing a multiple wavelength signal 112 to device 100 and an output optical fiber 104 capable of removing at least a portion of signal 112 from device 100. A photodetector 120 receives the portion of the optical signal from the output fiber 104.

Optical device 100 also includes a first dispersive grating arrangement 118a and a second dispersive grating arrangement. In this example, a first dispersive grating arrangement 118a operates to separate the multiple wavelength signal 112 into discrete wavelengths or channels ($\lambda_1$-$\lambda_n$) and to focus the wavelengths onto the SLM 108. Similarly, a second dispersive grating arrangement 118b operates to combine the reflected wavelengths from SLM 108 into an output multiple wavelength optical signal 114 and to focus signal 114 into output optical fiber 104. First and second dispersive grating arrangements may include a combination of gratings, lens (e.g., collimating lens) as well as other optical elements.

The SLM 108 is operable to spatially modulate the optical wavelengths. The SLM 108 selectively communicates by reflection one or more of the optical wavelengths to the optical output fiber 104 while modulating the incoming wavelengths such that the SLM 108 acts as a tunable filter.

One type of micro-mirror based SLM is a digital micro-mirror device (DMD). A DMD is comprised of a two-dimensional array of micromirrors or pixels, each actuatable in an ON state or an OFF state. As used herein in the context of a DMD, the terms "micromirror" and "pixel" are used interchangeably. Typically, a DMD consists of an array of tiny mirrors (typically, several million per square inch), wherein the angular position of each mirror element is individually controllable between at least two positions that are angularly offset from one another by approximately 10 to 20 degrees, for instance. A mirror base is located behind the mirror elements. The individually addressable mirror elements are tiltably mounted on mechanical hinges, and typically the array of mirror elements overlays a layer of controlling circuitry in the mirror base, all of which is mounted on a semiconductor chip. The mirror face of the DMD is composed of a generally rectangular grid array of rectangular or square mirror elements. A typical mirror element is about 16 micrometers square, and the individual elements are separated from one another by a distance of about 1 micron. Individually controlled tilting of the mirror elements in the array around at least one axis allows energy that is reflected from the mirror face to be formed into a predetermined pattern. Further, the mirror face can be substantially instantaneously reconfigured in response to digital signals to form a different pattern. Such reconfiguration is accurate and reproducible, and can generally be achieved in about 25 microseconds or less.

Figure 2:
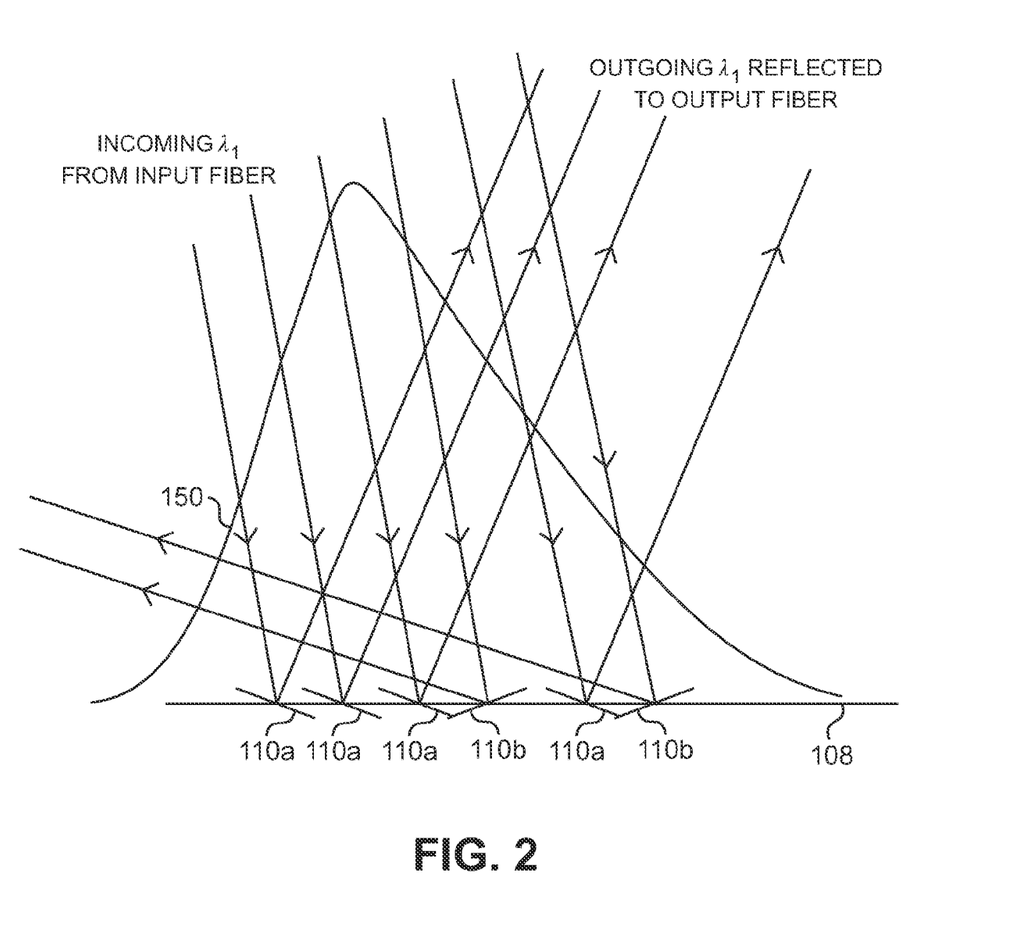
FIG. 2 is an enlarged partial view of an SLM that may be employed in the optical device of FIG. 1.

In the example of FIG. 1 the SLM 108 is a DMD in which the pixels are formed from a series of micromirrors (not visible in FIG. 1). Typically, each individual wavelength received by SLM 108 is spread over several micromirrors to enable micromirrors 110 to control the amount of light that couples into output fiber 104. This is most clearly seen in FIG. 2, which is an enlarged partial view of SLM 108. For clarity FIG. 2 only shows the micromirrors 110 upon which wavelength $\lambda_1$ is incident. As with any optical beam, the intensity of wavelength $\lambda_1$ is spatially distributed, as indicated by intensity distribution curve 150. The intensity distribution curve is often a Gaussian distribution, as shown, but is not limited thereto. In operation, on-state micromirrors 110a operate to selectively reflect at least some of the energy of wavelength $\lambda_1$ to output fiber 104. In addition, OFF-state micromirrors 110b operate to selectively reflect some of the energy in wavelength $\lambda_1$ away from output fiber 104. In this example the OFF-state micromirrors 110b reflect the energy to drop port 106. In this way the SLM 108 can vary the optical power of wavelength $\lambda_1$ coupled into output fiber 104 by selectively varying the operating state of some of the micromirrors 110. The wavelength $\lambda_1$ may even be completely attenuated or blocked by placing all the micromirrors 110 on which $\lambda_1$ is incident in their OFF-state. The optical power of wavelengths $\lambda_2$-$\lambda_n$ that is directed to output port 104 by the SLM 108 can be attenuated or otherwise varied in a similar manner.

The structure of the SLM-based channel monitor shown in FIG. 1 is just one example of an optical system in which the embodiments discussed in this application can be applied. For example, in some applications, it may be desirable to direct the reflected beam back along the same path and use a circulator or other means to separate the incoming and outgoing beam. In other embodiments the SLM 108 may selectively communicate one or more wavelengths to the output fiber 104 by transmission instead of reflection.

Figure 3:
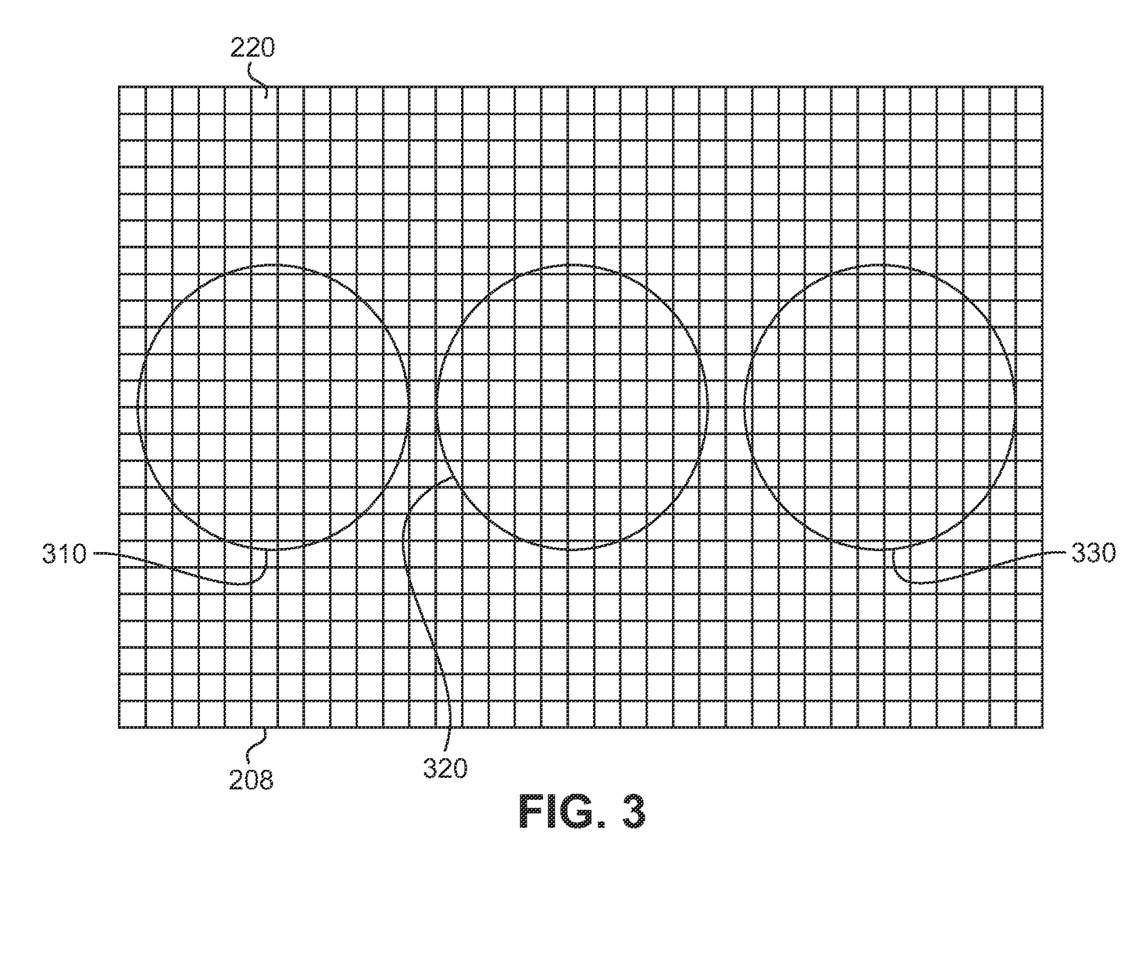
FIG. 3 shows a plan view of an SLM that may be employed in the optical device of FIG. 1.

FIG. 3 shows a plan view of the SLM 208 (i.e., SLM 108 in FIG. 1) employed in the optical device of FIG. 1 as well as spatially separated optical wavelengths $\lambda_1$, $\lambda_2$ and $\lambda_3$ (represented by beams 310, 320 and 330, respectively) that are focused onto the SLM 108 by the first dispersive grating arrangement 118a. FIG. 3 also shows the individual pixels 220 (only one of which is labeled) of the SLM 108 onto which the optical wavelengths $\lambda_1$, $\lambda_2$ and $\lambda_3$ are incident. Although 3 wavelengths are shown for purposes of illustration, more generally any number of wavelengths may be spatially separated across the SLM 208. In this example the spectral dispersion axis of the SLM 208 is assumed to be in the horizontal direction and the orthogonal axis along which individual wavelengths are contained is assumed to be in the vertical direction. This orthogonal axis will be referred to herein as the beam axis. However, other orientations are also possible. In the case of a DMD, the pivoting axes of the micromirrors will generally extend parallel to the spectral dispersion axis. As FIG. 3 shows, the beam diameter for each wavelength in this example extends over about ten pixels.

To perform channel monitoring, the SLM 208 in optical device 100 can be used as a tunable filter with a programmable filter function that can adjust the filter passband and center wavelength independently. When terminated with a photodiode, this device can be used to quickly and accurately measure the power of channels with different bandwidths, different modulation formats, and irregular channel spacings. Thus the addition flexibility of this filter to fully program the optical transfer function enables the device to improve speed and accuracy by adapting to future WDM system formats that mix modulation formats and channel spacings. This is valuable because it avoids the need to enforcing rigid channel guidelines or assumptions for optical monitoring purposes.

A preferable embodiment of the invention is to use the SLM device as a narrowband filter to first characterize the signal being monitored by actuating into their ON-state a limited number (e.g., one) of columns of the pixels 220. That is, the passband of the SLM 108 when it is used as a filter can be as narrow as a single pixel. The passband of the SLM 108 can be scanned across the signal spectrum by sequentially actuating into their ON-state successive columns of pixels so that the signal profile or channel plan of the signal can be determined. Once the signal has been characterized in this manner, the SLM 108 can be reconfigured by suitable actuation of the pixels to provide a filter shape that allows the aggregate signal power level to be accurately determined in a single measurement.

The optical device 100 described above can be used as a channel monitor to monitor a signal having any arbitrary channel plan. Significantly, no advance knowledge of the channel plan is needed to perform the monitoring function. The channel plan independence of the optical device 100 arises from the ability to spread a single optical channel over multiple pixels. Simply by the proper adjustment of the SLM 108, which can be readily achieved, for example, through software operating on the SLM through a programmable controller, a signal with any arbitrary channel plan can be monitored.

As described above, the channel plan independence of the channel monitor can be achieved with a tunable filter that has a single adjustable passband. The SLM 108, however, can be configured to have more complex filter shapes, including multiple passbands that each have a different shape. This capability can be used to provide a channel monitor with many additional features. For instance, the SLM 108 can be configured to have a filter shape that suppresses all the channels and allows the aggregate amplified spontaneous emission (ASE) to be detected in a single measurement. Conversely, the SLM 108 can be adjusted so that it removes all the ASE and only allows the channels to be measured by the photodetector.

In some embodiments the functionality of the optical channel monitor may be directly integrated with a device that performs additional functions. One example of such a device is an optical switch such as a wavelength selective switch. Such integration offers a number of advantages, including a reduction in space requirements and even possibly eliminating the need for an extra slot in a network rack that would otherwise be occupied by a dedicated channel monitor. Moreover, integrating the OCM within a switch or other device allows the device itself to directly make use of the information provided by the monitor without mediation of system management software. For example, the optical channel monitor can be used to check whether the channels comprising the output signal from the switch have equal power, and if not provide feed-back in order to achieve the required equalization.

Another important advantage that arises from the use of an optical switch or other device that is integrated with an optical channel monitor concerns the usual tradeoffs between isolation or sharpness of a filter and the flatness of its passband. In particular, high isolation is needed to distinguish between adjacent channels or between the channels and noise. In general, the tunable filters used in the channel monitor should be as sharp as the filters that are used by other devices in the network to process the optical signal. If the channel monitor and the optical switch or other optical device shares many of the same optical elements, in particular those used to perform filtering, this criterion can be automatically met.

One example of a wavelength selective switch in which an optical channel monitor of the type described above may be incorporated will be described with reference to FIGS. 4-9. Additional details concerning this optical switch may be found in co-pending U.S. application Ser. No. 11/781,931 entitled "Multiple Function Digital Optical Switch."

Figure 4:
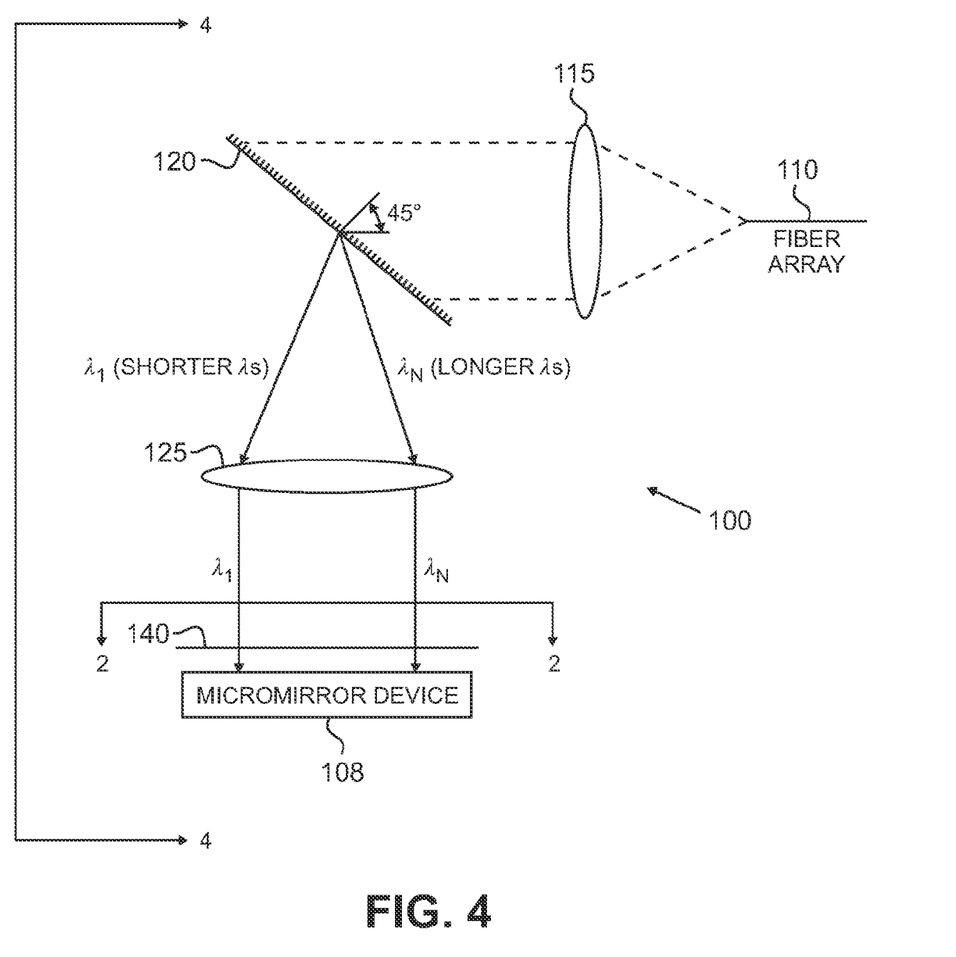
FIG. 4 shows a side view of a wavelength selective switch.

FIG. 4 shows a first side view of the wavelength selective switch 100. The switch includes an array 110 of parallel input/output optical ports (e.g., fibers) in the plane coming out of the page, only one of which is visible in FIG. 4. A collimating lens 115 is positioned to receive light exiting from the fiber array 110. The collimating lens 115 is centered about the optical axis extending from the middle fiber in fiber array 110. In this way light exiting the fibers in the fiber array 110 is collimated by lens 115. The collimated light is then incident upon a transmission grating 120, which spatially separates the light into its component wavelengths $\lambda_1, \lambda_2, \lambda_3, \ldots \lambda_N$ and directs them through a second lens 125. Lens 125 performs different functions in the two axes of the lens plane. In the plane of the page in FIG. 4, the lens collimates the dispersed wavelengths $\lambda_1$ through $\lambda_N$. In the plane out of the page the lens focuses the collimated beam onto the surface of the SLM 108. The result is a stripe of spatially separated wavelengths that are collimated along the axis of dispersion, and focused perpendicular to that axis, where the stripe is directed between mirror strips 140 (only one of which is visible in FIG. 4) and onto the surface of the SLM 108.

Figure 5:
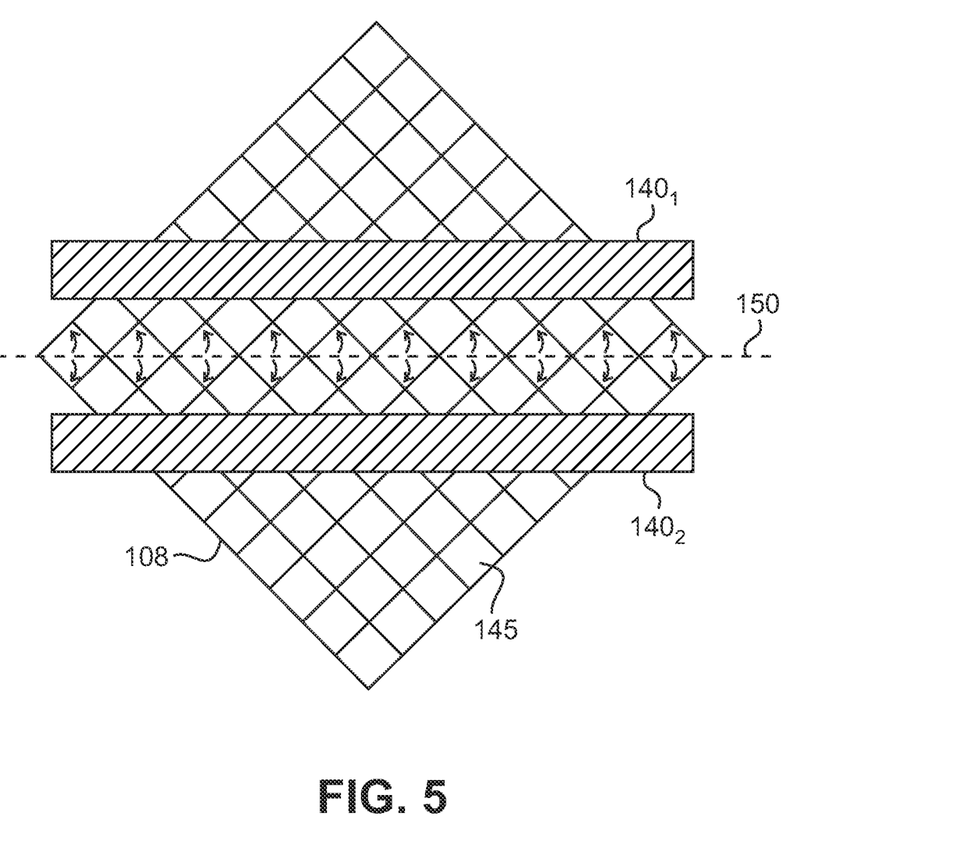
FIG. 5 shows a plan view of the surface of the SLM on which the wavelengths are incident, taken along line 2-2 in FIG. 4.

FIG. 5 shows a plan view of the surface of the SLM 108 on which the wavelengths are incident, taken along line 2-2 in FIG. 4. The SLM 108 in this example is a DMD of the type described above, which includes a two-dimensional array of micromirrors or pixels 145. As indicated in FIG. 5 by dashed line 150, the axis of the micromirrors extends diagonally from one corner to the opposite corner of each mirror element.

Mirror strips 140$_1$ and 140$_2$ ("mirror strips 140") are situated over the surface of the micromirror device 108 and extend in a direction parallel to the axis 150. The mirror strips 140 can be fabricated directly on the lower surface of a transparent window or substrate using conventional lithographic or other techniques. The substrate can be integrated with the SLM device 108 to form a single optical assembly. An anti-reflective coating may be applied to the upper surface of the window to reduce back reflections. Likewise, an anti-reflective coating may be applied to the nonreflective portions of the lower surface between the individual mirror strips.

Figure 6:
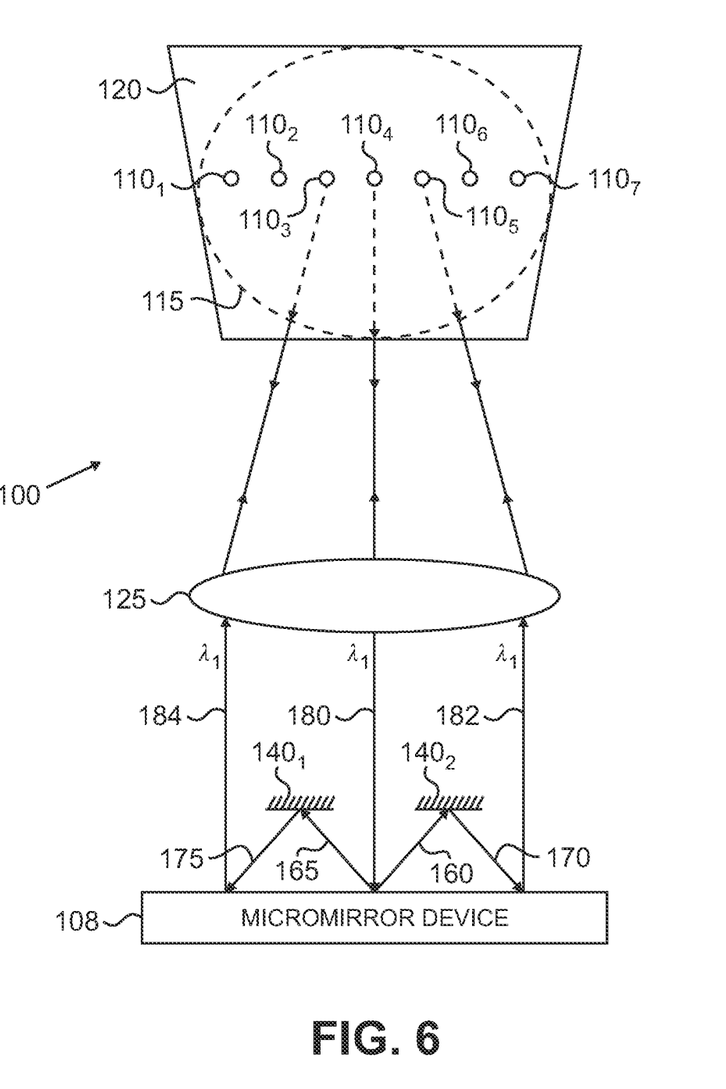
FIG. 6 is another side view of the wavelength selective switch taken along line 4-4 in FIG. 4.

FIG. 6 is a second side view of the wavelength selective switch taken along line 4-4 in FIG. 4. This view illustrates the manner in wavelength $\lambda_1$ is selectively switched from an input fiber (i.e., fiber 110$_4$) in fiber array 110 to one of two output fibers 110$_3$ and 110$_5$ in fiber array 110. The remaining wavelengths $\lambda_2$-$\lambda_N$ are selectively switchable in a similar manner.

The dimensions of the mirror elements in DMD 108 are sufficiently small relative to the optical wavelengths that are employed in the switch 100 so that the light is diffracted off the DMD 108. Accordingly, depending on the tilt angle of the mirror elements upon which wavelength $\lambda_1$ is incident, the DMD 108 serves as a blazed grating and the light will be diffracted up and to the right along path 160 or, alternatively, up and the left along path 165. The diffracted light will reinforce itself as it reflects back toward mirror strips 140$_1$ or 140$_2$, forming a series of points of light at locations represented by various diffraction orders. Likewise, the diffracted light will cancel itself out between the orders. Thus, in order to maximize the light that reaches mirror strips 140$_1$ or 140$_2$, the mirror strips should each be located at one of the diffraction orders for the wavelengths. In the particular example shown in FIG. 1, the mirrors 140$_1$ and 140$_2$ are located at the −2 order diffraction and the +2 order diffraction, respectively. That is, the light diffracted along paths 160 and 165 represent second order diffraction. More generally, however, the mirror strips 140$_2$ and 140$_2$ may be located at any appropriate diffraction order.

Figure 7A:
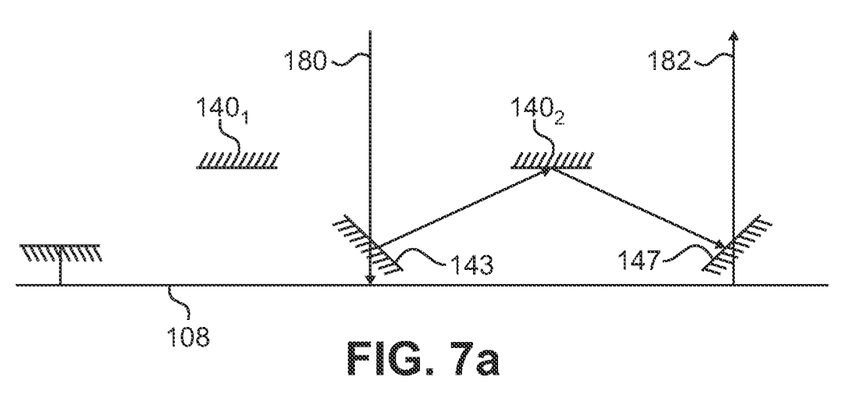
FIG. 7a illustrates a first light path being reflected off a first single mirror element and a second light path being reflected off a second single mirror element in a DMD, with the two mirror elements being tilted in opposite directions.

If the light is incident upon mirror strip 140$_1$, it will be reflected back to the DMD 108 along path 175. On the other hand, if the light is incident upon mirror strip 140$_2$, it will be reflected back to the DMD 108 along path 170. If the mirror elements upon which light beam 170 or 175 is incident are tilted in the opposite position from the mirror elements upon which the initial incoming wavelength $\lambda_1$ is incident along path 180, then the light will be reflected back toward the second collimating lens 125 along paths 180 or 182, which are parallel to path 180. This is illustrated in FIG. 7a, where for simplicity the light path 180 is shown being reflected off a single mirror element 143 and the light path 182 is shown being reflected off a single mirror element 147 in the DMD 108. As shown, mirror elements 143 and 147 are tilted in opposite directions. Note that if the optical beam is incident on more than one mirror of the DMD, it is possible to simultaneously direct different portions of the beam to both outputs 180 and 182. This capability is referred to as programmable multi-casting, which effectively allows a light beam to be split and coupled into multiple output ports.

Referring again to FIG. 6, after traveling along path 180 or 182 after its second reflection off the DMD 108, the light will then traverse the grating 120 and the first collimating lens 115 in a reciprocal manner from that described above. If the light has been reflected off the DMD 108 along path 182, then the light will be received by output port 110$_5$. On the other hand, if the light has been reflected off the DMD 108 along path 184, then the light will be received by output port 110$_3$. In this way the wavelength $\lambda_1$ can be switched from input port 110$_4$ to a selected one of the output ports 110$_3$ and 110$_5$. The remaining wavelengths $\lambda_1$-$\lambda_N$ can be switched in a similar manner.

Figure 7B:
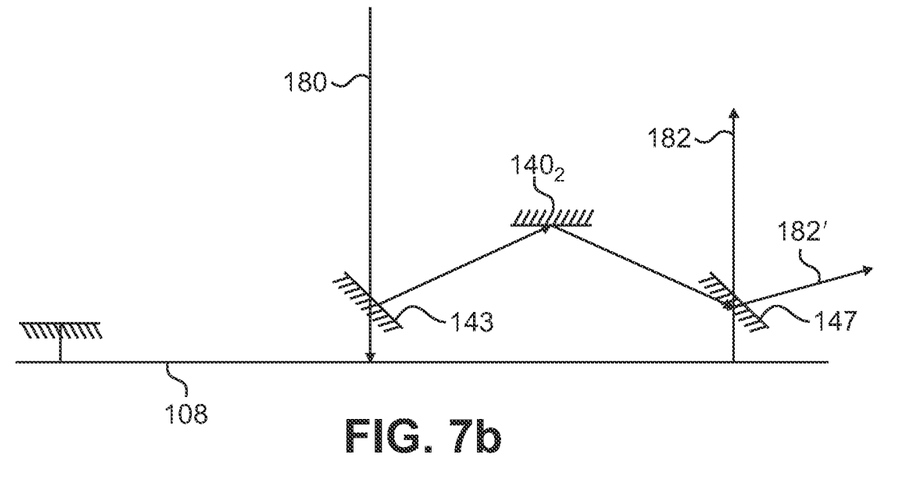
FIG. 7b illustrates a first light path being reflected off a first single mirror element and a second light path being reflected off a second single mirror element in a DMD, with the two mirror elements being tilted in the same direction.

The individual wavelengths may be switched from the input port 110$_4$ to one of the output ports 110$_3$ and 110$_5$ in either a relatively lossless manner or with a controllable amount of attenuation. The attenuation can be imparted by tilting a selected number of the mirror elements upon which the switching wavelength is received from one of the mirror strips 140$_1$ and 140$_2$. This can be illustrated in connection with FIG. 7b, which shows incoming light path 180 and the outgoing light path 182. As previously noted in connection with FIG. 7a, for simplicity, the light path 180 is shown being reflected off the single mirror element 143 and the light path 182' is shown being reflected off the single mirror element 147. In FIG. 7a the mirror elements 143 and 147 are tilted in opposite directions. In FIG. 7b on the other hand, mirror elements 143 and 147 are both tilted in the same direction and as a result the light is reflected off the mirror element 147 along path 182', where it is directed away from the fiber array 110 and thus is lost. By properly tilting any selected number of the mirror elements that reflect components of the switching wavelength incident upon the DMD 108 a second time, such as in the case of mirror element 147, the light directed to the selected output port or fiber can be attenuated by a selected amount. More specifically, the light can be attenuated in increments equal to the amount of light reflected off a single mirror element. FIG. 7b thus illustrates a general principle of operation of the wavelength selective switch 100. The first set of mirror elements (e.g., mirror elements 143) that the switching wavelength diffracts off of control the output port to which the switching wavelength is directed. The second set of mirror elements (e.g., mirror elements 147) that the switching wavelength diffracts off of control the attenuation of the switching wavelength. Note that if mirror element 147 is positioned in the off or float state, the light path 182 could be reflected onto a subsequent one of the mirror strips 140, which in turn reflects the light back to the DMD 108 from which it could be redirected to one or more additional output ports.

Figure 8:
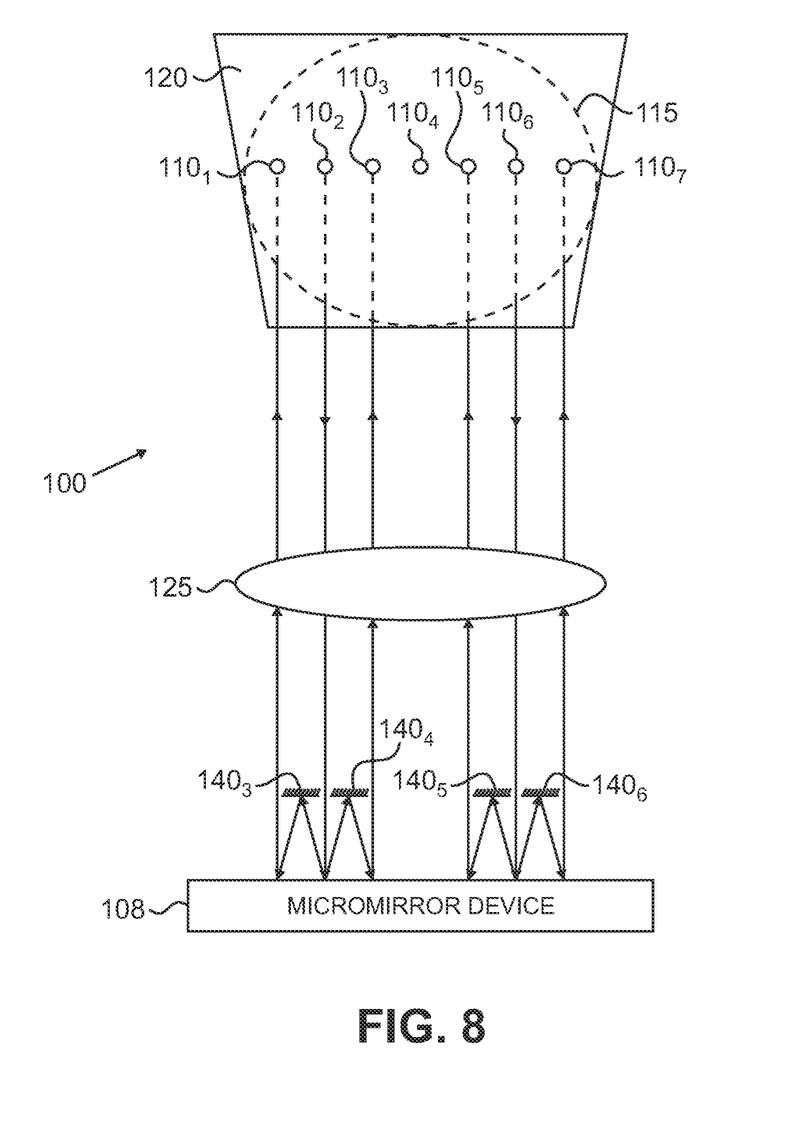
FIG. 8 shows seven fibers or ports of a wavelength selective switch (taken along lines 4-4 in FIG. 4), any three of which can serve as a 1×2 switch in which the center port serves as the input ports and the outer ports serve as the output ports.

As described above in connection with input port $110_4$ and output ports $110_3$ and $110_5$, the wavelength selective switch serves as a 1×2 switch. Many other switch configurations are possible using the 1×2 switch as a fundamental building block. For instance, any number of such 1×2 switches may be formed using a single DMD, provided that the appropriate number of mirror strips 140 are employed. In FIG. 8, for example, seven fibers or ports are shown, any three of which can serve as 1×2 switch in which the center port serves as the input ports and the outer ports serve as the output ports. For instance, one switch may be formed by ports $110_1$, $110_2$ and $110_3$, with port $110_2$ serving as the input port, while another switch may be formed by ports $110_5$, $110_6$ and $110_7$, with port $110_6$ serving as the input port. FIG. 8 shows the switch 100 when configured in this manner. Similar to FIG. 6, FIG. 8, as well as FIG. 9 described below, is a side view of the switch 100 taken along lines 4-4 in FIG. 4. In this example the 1×2 switch associated with ports $110_1$, $110_2$ and $110_3$ employs mirror strips $140_3$ and $140_4$ and the 1×2 switch associated with ports $110_5$, $110_6$ and $110_7$ employs mirror strips $140_5$ and $140_6$.

Figure 9:
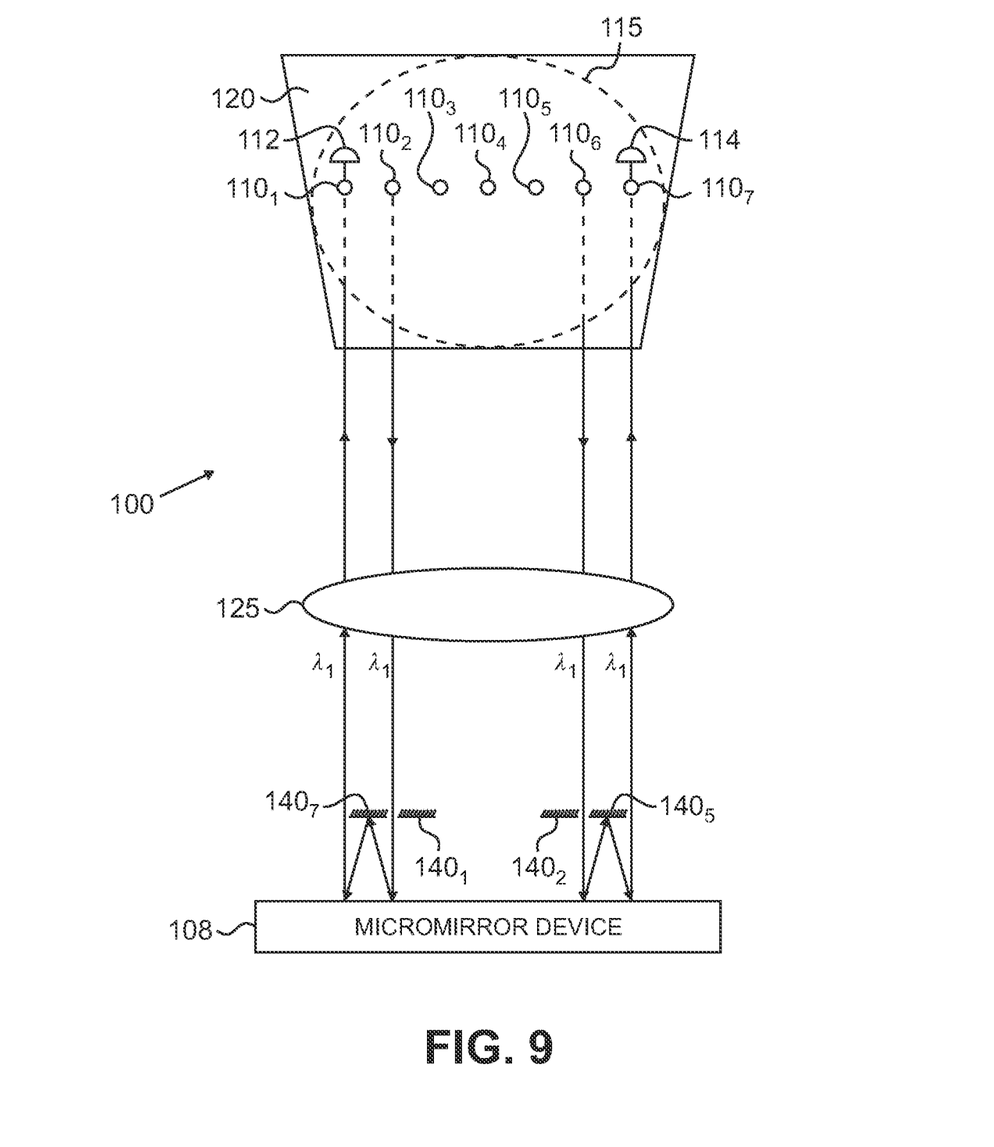
FIG. 9 shows the switch of FIG. 6 in which three ports serve as a 1×2 switch and two sets of other ports $110_1$ and $110_2$ serve as optical channel monitors.

Optical channel monitoring may be performed using any two adjacent ports in the wavelength selective switch 100, one of which serves as the input and the other of which serves as the output port at which an optical detector can be placed. FIG. 9 shows the switch 100 of FIG. 6 in which ports $110_3$, $110_4$ and $110_5$ serve as a 1×2 switch and ports $110_1$ and $110_2$ serve as one optical channel monitor and ports $110_6$ and $110_7$ serve as another optical channel monitor. Ports $110_2$ and $110_6$ serve as the inputs and ports $110_1$ and $110_7$ serve as the outputs at which detectors 112 and 114 are located. It should be noted that more generally any two adjacent ports in the wavelength selective switch 100 may serve as a 1×1 switch.

Although various embodiments are specifically illustrated and described herein, it will be appreciated that modifications and variations of the present invention are covered by the above teachings and are within the purview of the appended claims without departing from the spirit and intended scope of the invention. For example, as previously mentioned, the functionality of the optical channel monitor may be directly integrated with other devices besides the optical switch described above. Such devices include, without limitation, optical amplifiers, chromatic dispersion controllers, optical add/drop multiplexers, variable optical attenuators, and the like.

The invention claimed is:

1. A method of monitoring a WDM optical signal, comprising:
    receiving a WDM optical signal having a plurality of channels;
    detecting the optical signal after filtering the WDM optical signal with a tunable filter to determine a channel plan of the WDM optical signal;
    based on the channel plan that has been determined by detecting the WDM optical signal, reconfiguring at least a center wavelength and bandwidth of the tunable filter optical transfer function to determine a signal performance parameter of the WDM optical signal;
    filtering the optical signal with a tunable filter configured to have at least a first optical transfer function, wherein the first optical transfer function has a width narrower than a bandwidth of each of the optical channels;
    detecting the filtered optical signal to determine a second optical transfer function optimized to measure a parameter of a channel in the WDM optical signal;
    filtering the optical signal with the tunable filter configured to have the second optical transfer function; and
    while the optical signal is being filtered by the tunable filter configured with the second optical transfer function, detecting the optical signal to determine a signal performance parameter of the WDM optical signal.

2. The method of claim 1 further comprising scanning the first optical transfer function across a spectrum of the WDM optical signal and detecting the filtered optical signal as the first optical transfer function is being scanned to determine the signal profile.

3. The method of claim 1 wherein the tunable filter includes a spatial light modulator (SLM) having an array of pixels and further comprising:
    spatially dispersing the WDM optical signal onto the SLM so that each channel is incident upon a plurality of pixels; and
    configuring and reconfiguring the tunable filter by selective adjustment of the pixels into a first or second state.

4. The method of claim 1 wherein the signal performance parameter being determined is aggregate power in one channel of the WDM optical signal.

5. The method of claim 1 wherein the signal performance parameter being determined is amplified spontaneous emission associated with individual channels in the optical signal.

6. The method of claim 1 wherein at least one of the plurality of channels has a different transmission rate.

7. The method of claim 1 wherein at least one of the plurality of channels has a different modulation format.

8. The method of claim 1 wherein the tunable optical filter has a passband and center wavelength that are independently adjustable.

9. The method of claim 8 wherein the tunable optical filter has a plurality of passbands.

10. The method of claim 1 wherein the channel plan of the WDM optical signal includes channels with different channel spacings from adjacent channels.

11. The method of claim 1 wherein the channel plan of the optical signal is unknown to a service provider carrying the optical signal prior to being determined by detecting the optical signal.

12. The method of claim 1 wherein the tunable filter includes an SLM.

13. The method of claim 12 wherein the SLM is a digital micromirror device (DMD).

14. An optical device, comprising:
    an input port for receiving a WDM optical signal having a channel plan;
    at least two optical output ports;
    a tunable optical filter with programmable wavelength dependent transmission to change at least the center wavelength and bandwidth of the optical transfer function of the optical signal;
    a detector for receiving the optical signal after being modulated by the tunable optical filter, the detector being associated with one of the output ports; and a controller for causing the tunable optical filter to be arranged into optical transfer functions between the input port and the detector which samples different components of the spectrum of the WDM optical signal using at least a first and second optical transfer function between the input port and the detector where the optical transfer functions passband characteristics are optimized to improve the measurement accuracy of different channels or components of the WDM optical signal, wherein the second optical transfer function is determined at least in part by determining the channel plan of the WDM optical signal when the tunable optical filter is arranged with the first optical transfer function;

a dispersive optical element for spatially dispersing the optical signal into a plurality of wavelengths;

an SLM having a surface for receiving the spatially dispersed wavelengths, wherein the surface includes an array of pixels such that each of the wavelengths are incident upon a plurality of the pixels, each of the pixels being in one of a multiple of discrete states that provide different amounts of modulation to optical energy incident thereon;

an optical element for receiving wavelengths modulated by the SLM and directing them back onto selected ones of the pixels of the SLM; and a controller for causing the array of pixels in the SLM to be arranged into selectable patterns of states, the selectable pattern of states including (i) a first series of patterns that yields a first optical transfer function between the input port and the detector which scans across a spectrum of the WDM optical signal to determine a channel plan of the WDM optical signal and (ii) a second pattern that yields a second optical transfer function between the input port and the detector which is determined at least in part by the determination of the channel plan of the WDM optical signal so that a signal performance parameter of the WDM optical signal is measurable by the detector.

15. The optical device of claim 14 wherein the optical device is a wavelength selective switch.

16. The optical device of claim 14 wherein the first and second optical transfer functions transmit a different frequency bandwidth.

17. The optical device of claim 14 wherein the controller is further configured to cause the tunable optical filter to perform a switching function between the input port and any remaining one of the output port other than the output port associated with the detector.

18. The optical device of claim 14 wherein the tunable optical filter has a passband and center wavelength that are independently adjustable.

19. The optical device of claim 18 wherein the tunable optical filter has a plurality of passbands.

20. The optical device of claim 14 wherein the channel plan of the WDM optical signal includes channels with different channel spacings from adjacent channels.

21. The optical device of claim 14 wherein the channel plan of the optical signal is unknown to a service provider carrying the optical signal prior to being determined by detecting the optical signal.

22. The optical device of claim 14 wherein the SLM is a digital micromirror device (DMD).

23. A method of monitoring a WDM optical signal, comprising:

receiving a WDM optical signal having a plurality of channels;

detecting the optical signal after filtering the WDM optical signal with a tunable filter;

reconfiguring at least a center wavelength and bandwidth of the tunable filter optical transfer function to determine a signal performance parameter of the WDM optical signal;

filtering the optical signal with a tunable filter configured to have at least a first optical transfer function;

detecting the filtered optical signal to determine a second optical transfer function optimized to measure a parameter of a channel in the WDM optical signal;

filtering the optical signal with the tunable filter configured to have the second optical transfer function; and while the optical signal is being filtered by the tunable filter configured with the second optical transfer function, detecting the optical signal to determine a signal performance parameter of the WDM optical signal, wherein the first optical transfer function has a width narrower than a bandwidth of each of the optical channels.

24. The method of claim 23 wherein the tunable filter includes a spatial light modulator (SLM) having an array of pixels and further comprising:

spatially dispersing the WDM optical signal onto the SLM so that each channel is incident upon a plurality of pixels; and configuring and reconfiguring the tunable filter by selective adjustment of the pixels into a first or second state.

25. An optical device, comprising:

an input port for receiving a WDM optical signal;

a tunable optical filter with programmable wavelength dependent transmission to change at least the center wavelength and bandwidth of the optical transfer function of the optical signal;

a detector for receiving the optical signal after being modulated by the tunable optical filter; and a controller for causing the tunable optical filter to be arranged into optical transfer functions between the input port and the detector which samples different components of the spectrum of the WDM optical signal using at least a first and second optical transfer function between the input port and the detector where the optical transfer functions passband characteristics are optimized to improve the measurement accuracy of different channels or components of the WDM optical signal;

a dispersive optical element for spatially dispersing the optical signal into a plurality of wavelengths;

an SLM having a surface for receiving the spatially dispersed wavelengths, wherein the surface includes an array of pixels such that each of the wavelengths are incident upon a plurality of the pixels, each of the pixels being in one of a multiple of discrete states that provide different amounts of modulation to optical energy incident thereon;

a controller for causing the array of pixels in the SLM to be arranged into selectable patterns of states, the selectable pattern of states including (i) a first series of patterns that yields a first optical transfer function between the input port and the detector which scans across a spectrum of the WDM optical signal to determine a signal profile of the WDM optical signal and (ii) a second pattern that yields a second optical transfer function between the input port and the detector which is determined at least in part by the signal profile of the WDM optical signal so that a signal performance parameter of the WDM optical signal is measurable by the detector;

at least two optical output ports, the detector being associated with one of the output ports; and an optical element for receiving wavelengths modulated by the SLM and directing them back onto selected ones of the pixels of the SLM.

26. An optical device, comprising:

an input port for receiving a WDM optical signal having a channel plan;

a tunable optical filter with programmable wavelength dependent transmission to change at least the center wavelength and bandwidth of the optical transfer function of the optical signal, wherein the tunable optical filter includes an SLM;

a detector for receiving the optical signal after being modulated by the tunable optical filter;

an optical element for receiving wavelengths modulated by the SLM and directing them back onto selected SLM pixels; and a controller for causing the tunable optical filter to be arranged into optical transfer functions between the input port and the detector which samples different components of the spectrum of the WDM optical signal using at least a first and second optical transfer function between the input port and the detector where the optical transfer functions passband characteristics are optimized to improve the measurement accuracy of different channels or components of the WDM optical signal, wherein the second optical transfer function is determined at least in part by determining the channel plan of the WDM optical signal when the tunable optical filter is arranged with the first optical transfer function.

* * * * *